Patented Dec. 23, 1952

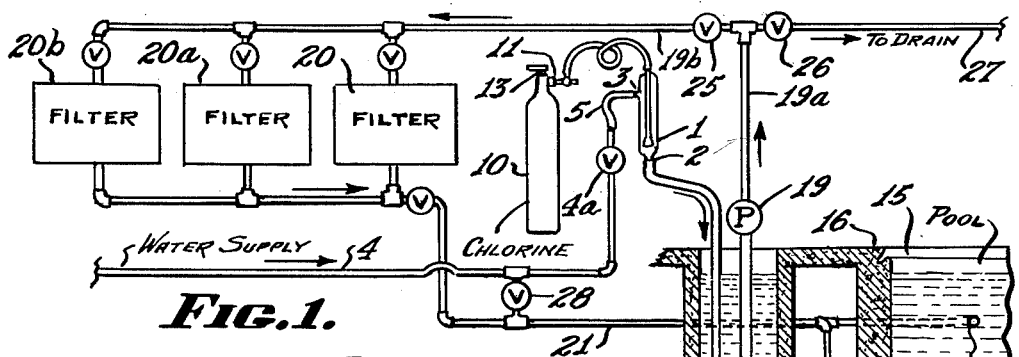
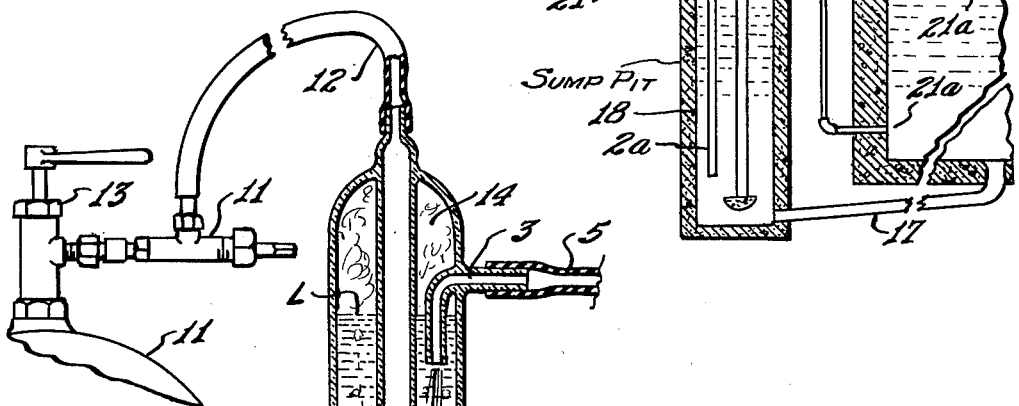
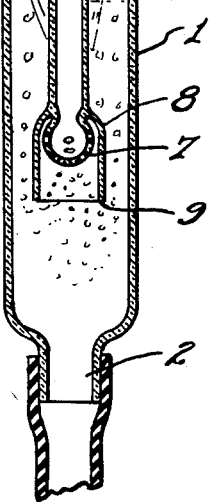
Inventor.
WALTER F. KLOTH,
Attorneys.

2,623,014

UNITED STATES PATENT OFFICE 2,623,014

WATER CHLORINATORS AND WATER CHLORINATION SYSTEMS

Walter F. Kloth, Cincinnati, Ohio

Application January 30, 1951, Serial No. 208,583

5 Claims. (Cl. 210—28)

My invention relates to chlorinators and systems of chlorinating the water of a swimming pool continuously to maintain a standard of water purity.

In such a system it is an objective of my invention to provide a chlorinator made of glass or other transparent non-corrodible material which will be entirely automatic and which operates without control valves so that once having been set by valves, not forming part of the chlorinator, for a predetermined rate of chlorination, it may be safely left over long periods without the necessity of inspection or adjustment.

The foregoing objects and other objects which will be disclosed in the following description, I accompilsh by that certain combination and arrangement of parts of which I have illustrated a preferred embodiment.

In the drawings:

Figure 1 is a diagrammatic layout of a swimming pool water chlorination system.

Figure 2 is a vertical sectional view of my new valveless chlorinator.

Referring first to the chlorinator (Figure 2), I have shown a vertically arranged sight glass cylinder 1, preferably made of glass or other transparent non-corrodible material. At 2 is shown the bottom gravity discharge outlet from the cylinder 1, which discharge outlet preferably has an inside diameter of approximately $7/8$ inches. Since the outflow is under less normal pressure than the inlets for water and chlorine the size of this outlet 2 is substantially of larger diameter than the said inlets presently to be described.

At 3 I have shown the water inlet tube which, as indicated, after extending through the wall 1 is bent downwardly in a substantially vertical direction and terminates above the level of a half way mark in the cylinder 1 possibly down one-third the height of the glass. The water supply line has a valve 4a which controls the flow of water into the cylinder or chamber 1. The valve 4a may be of the pressure regulating type and is connected to the water inlet 3 of the cylinder 1 by means of a rubber tube 5. The size of the inlet 3 is constricted so that water being discharged downwardly into the chamber will have a jet action. Ordinarily water under from five to twenty pounds pressure will be on the system to which the valve 4a is connected. The jet has an inside diameter of from $1/8$ inches to $1/4$ inches. Thus the area of the injector pipe to the area of the gravity discharge is in a ratio of one to sixteen or more.

The chlorine inlet is through a glass tube 6 having at its lower extremity, as a distributor head, an enlarged perforated glass ball 7 which permits great reduction in pressure of the chlorine entering through the tube 6. The head is at a level about one-third the height of the glass. The water within the sight glass is normally maintained at about the level indicated at L, an inch or more above the lower end of the tube 3. The tube 3 extends down vertically and is located about half way between the axial center of the cylinder and the side wall. With gas bubbling up through the water in tube 1, the incoming water acts as a jet to thoroughly agitate the gas as it dissolves in the water.

Surrounding the perforated glass bulb 7 and preferably integrally molded with the tube 6 is a cylindrical gas pressure chamber 8. The lower end of the chamber 8 is open as indicated at 9. It will be obvious that the chamber 8 forms a gas pressure chamber which varies only with the rise and fall of the water level in the cylinder.

Chlorine gas is admitted from a cylinder such as is indicated at 10 and which forms no part of the combination through a regulator valve 11. The regulator valve 11 is set to admit a substantially predetermined and controlled supply of chlorine gas and is connected by means of a rubber tube 12 to the tube 6. Thus irrespective of the adjustment of the valve 13 on the chlorine drum, the control of the supply introduced is through the regulator valve 11.

It will be noted that above the level of the water in the cylinder 1 there is a gas pocket 14. This acts as an automatic control for variations in the supply of water injected through the pipe 3 and the gravity outflow through the pipe 2. Normally the volume capacity of water passing into the sight glass from the jet 3 and discharging through the gravity discharge at the bottom will be about equal. In other words, if the water introduced is slightly more than the amount of chlorinated water discharged, pressure builds up in the pocket 14 causing a slight building up of pressure which increases the outflow. Under opposite conditions if the outflow exceeds the inflow, the level of the water in the cylinder becomes lowered and the outflow will be reduced just enough to cause the level of the top surface of the water in the cylinder to be elevated.

In Figure 1 I have shown the pool 15 having a water level 16. An underflow pipe 17 connects to a sump 18. It is into this sump 18 that the discharge from the chlorinator empties through tube 2a which tube may be a rubber hose approximately one inch inside diameter. A pump 19 pumps water from the sump through pipes 19a and 19b to filters 20, 20a and 20b. The pump 19 removes from the sump a greater amount of water than that which enters through the tube 2a, thus causing a flow of water from the pool 15 through the pipe 17 into the sump. Thus the freshly chlorinated water together with water from the pool is pumped to the filters and during the pumping and filtering process a thorough mixing occurs.

From the filters the chlorinated water flows through pipe 21 back to the pool 15, the water entering the pool through various inlets 21a arranged at intervals around the pool so that the freshly chlorinated water is evenly distributed therein.

With the arrangement of pipes and valves as shown in Figure 1, it will be apparent that other operations incident to operating and servicing the pool may readily be accomplished. Thus by closing the valve 25 and opening the valve 26, the pump 19 may be employed to drain the pool through drain pipe 27. By closing the valve 4a and opening the valve 28 the fresh water supply from line 4 may be directed into line 21 straight to the pool. If desired, the chlorinator may be shut off and circulation of the pool water through the filters and back to the pool accomplished by means of the pump 19.

While the arrangement of pipes and hookup for filtering the pool water forms no part of my invention, it appears novel to provide means for chlorinating the water as it is being passed to the filters and prior to the return of the filtered water to the pool.

Variations in structure which accomplish this automatic regulation of the introduction of chlorinated water will occur to those skilled in the art without departing from the principle involved.

Having thus described my invention, what I claim as new and desire to secure by Letters Patent is:

1. A glass chlorinator formed as an integral unit and comprising in combination a vertically arranged sight glass, a water jet injector extending downwardly about one third the height of the glass, a chlorine tube medially arranged in the cylinder having a distributor head extending down about two thirds the height of the sight glass, a gas pressure cylinder surrounding the chlorine tube and terminating at a level slightly above the distributor head and a discharge portion from the bottom of the sight glass having a gravity outflow capacity substantially equal to the inflow of the water jet injector.

2. A glass chlorinator formed as an integral unit comprising in combination a vertically arranged sight glass, a water jet injector extending downwardly about one third the height of the glass, a chlorine tube medially arranged in the cylinder having a distributor head extending down about two thirds the height of the sight glass, a gas pressure cylinder surrounding the chlorine tube and terminating at a level slightly above the distributor head and a discharge portion from the bottom of the sight glass having a gravity outflow capacity substantially equal to the inflow of the water jet injector, the area of the water jet injector having a ratio with respect to the gravity outflow of the discharge portion of about one to sixteen.

3. A glass chlorinator formed as an integral valveless unit enclosed in a vertically mounted sight glass cylinder and having a chlorine gas inlet tube extending down inside the cylinder substantially two thirds of its height, a water jet injector tube extending down inside the sight glass cylinder about one third of its height, a gravity outlet tube the area of the diameter of which is at least sixteen times that of the water jet injector tube.

4. A glass chlorinator formed as an integral valveless unit enclosed in a vertically mounted sight glass cylinder and having a chlorine gas inlet tube extending down inside the cylinder substantially two thirds of its height, a water jet injector tube extending down inside the sight glass cylinder about one third of its height, a gravity outlet tube the area of the diameter of which is at least sixteen times that of the water jet injector tube, said water jet injector tube extending vertically downwardly.

5. A glass chlorinator formed as an integral valveless unit enclosed in a vertically mounted sight glass cylinder and having a chlorine gas inlet tube extending down inside the cylinder substantially two thirds of its height, a water jet injector tube extending down inside the sight glass cylinder about on third of its height, a gravity outlet tube the area of the diameter of which is at least sixteen times that of the water jet injector tube, said chlorine gas inlet tube being enclosed in an inner glass cylinder within the sight glass cylinder.

WALTER F. KLOTH.

REFERENCES CITED

The following references are of record in the file of this patent:

UNITED STATES PATENTS

| Number | Name | Date |
| --- | --- | --- |
| 998,428 | Stuhler | July 18, 1911 |
| 1,746,186 | Bramwell | Feb. 4, 1930 |
| 1,762,314 | Sutphen et al. | June 10, 1930 |
| 1,865,976 | Somers | July 5, 1932 |
| 2,021,116 | Lambert | Nov. 12, 1935 |
| 2,049,559 | Evans | Aug. 4, 1936 |
| 2,541,799 | White | Feb. 13, 1951 |